US009451306B2

(12) United States Patent
Sarukkai et al.

(10) Patent No.: US 9,451,306 B2
(45) Date of Patent: Sep. 20, 2016

(54) SELECTING CONTENT FORMATS FOR ADDITIONAL CONTENT TO BE PRESENTED ALONG WITH VIDEO CONTENT TO A USER BASED ON PREDICTED LIKELIHOOD OF ABANDONMENT

(75) Inventors: Ramesh R. Sarukkai, Los Gatos, CA (US); Kevin O. Thompson, Foster City, CA (US); Jacob E. Huston, San Francisco, CA (US); Philippe Farhi, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/342,862

(22) Filed: Jan. 3, 2012

(65) Prior Publication Data

US 2013/0174045 A1    Jul. 4, 2013

(51) Int. Cl.
G06F 3/00 (2006.01)
H04N 21/258 (2011.01)
G06F 3/0481 (2013.01)
G06Q 30/02 (2012.01)
H04N 21/2343 (2011.01)
H04N 21/235 (2011.01)

(52) U.S. Cl.
CPC ...... H04N 21/25866 (2013.01); G06F 3/0481 (2013.01); G06Q 30/0255 (2013.01); H04N 21/2358 (2013.01); H04N 21/23439 (2013.01); H04N 21/25808 (2013.01)

(58) Field of Classification Search
CPC ........ G06F 9/4443; G06F 8/38; G06F 1/163; G06F 3/011
USPC ...................................... 715/744; 725/32, 51
See application file for complete search history.

(56) References Cited

U.S. PATENT DOCUMENTS

| | | | |
|---|---|---|---|
| 2003/0041159 A1* | 2/2003 | Tinsley | G06F 9/4443 709/231 |
| 2007/0157228 A1 | 7/2007 | Bayer et al. | |
| 2008/0109844 A1 | 5/2008 | Baldeschwieler et al. | |
| 2008/0120646 A1* | 5/2008 | Stern et al. | 725/34 |
| 2008/0307454 A1* | 12/2008 | Ahanger et al. | 725/36 |
| 2009/0164287 A1 | 6/2009 | Kies et al. | |
| 2009/0204901 A1* | 8/2009 | Dharmaji | G06Q 30/02 715/745 |
| 2009/0320073 A1* | 12/2009 | Reisman | 725/51 |
| 2011/0078718 A1* | 3/2011 | Jakobi | G06Q 10/00 725/14 |
| 2011/0161409 A1* | 6/2011 | Nair | G06F 8/38 709/203 |

FOREIGN PATENT DOCUMENTS

KR   10-2010-0099648   9/2010
KR   10-1003045   12/2010

OTHER PUBLICATIONS

Authorized officer Eng Gie Oh, International Search Report and Written Opinion in PCT/US2012/071644, mailed Apr. 12, 2013, 12 pages.

* cited by examiner

*Primary Examiner* — Kieu Vu
*Assistant Examiner* — Joy M Weber
(74) *Attorney, Agent, or Firm* — Foley & Lardner LLP; John D. Lanza (57) ABSTRACT

Methods, systems, and computer program products are provided for selecting content formats based on predicted user interest. One example method includes receiving a request to present additional content to a user in association with the user viewing a video content item during a session, identifying one or more candidate content formats, predicting a likelihood that the user will abandon the session for each candidate content format, selecting a format based at least in part on the predicting, determining when to present the additional content to the user, and presenting the additional content in accordance with the selected format.

20 Claims, 5 Drawing Sheets

SELECTING CONTENT FORMATS FOR ADDITIONAL CONTENT TO BE PRESENTED ALONG WITH VIDEO CONTENT TO A USER BASED ON PREDICTED LIKELIHOOD OF ABANDONMENT

BACKGROUND

This specification generally relates to information presentation.

Web sites have been configured for providing video content to users. Some video content web sites are supported by sponsor revenue (e.g., advertising revenue) and can provide content to users in addition to requested video content. To determine content to be provided to users, some video content web sites define rules and policies and/or optimize for generating revenue from content sponsors.

SUMMARY

In general, one innovative aspect of the subject matter described in this specification may be embodied in methods, systems, and computer program products for selecting content formats based on predicted user interest. One example method includes receiving a request to present additional content to a user in association with the user viewing a video content item during a session, identifying one or more candidate content formats, predicting a likelihood that the user will abandon the session for each candidate content format, selecting a format based at least in part on the predicting, determining when to present the additional content to the user, and presenting the additional content in accordance with the selected format.

In general, another example method includes identifying one or more candidate content item format types for content items to be presented to users in association with video content, predicting a likelihood a particular user will abandon a current session if presented with a candidate content item based at least in part on the content item format type of the candidate content item, determining whether to present the candidate content item to the particular user based at least in part on the predicting, and presenting the candidate content item based at least in part on the determining.

In general, another example method includes determining a prediction of a user's interest in receiving an additional content item in association with a viewing of a video content item during a session, determining a format for the additional content item, determining a time to deliver the additional content item during the session, identifying one or more candidate content items that satisfy the format, and delivering one of the candidate content items in accordance with the delivery time.

In general, another innovative aspect of the subject matter described in this specification may be embodied in computer program products that include instructions that when executed by one or more computers cause the one or more computers to perform operations including receiving a request to present additional content to a user in association with the user viewing a video content item during a session, identifying one or more candidate content formats, predicting a likelihood that the user will abandon the session for each candidate content format, selecting a format based at least in part on the predicting, determining when to present the additional content to the user, and presenting the additional content in accordance with the selected format.

In general, another innovative aspect of the subject matter described in this specification may be embodied in systems that include a content presentation system for presenting content to users. The content presentation system can include a session manager, a user behavior predictor, a content format selector, and a content timing selector. The session manager can receive a request to present additional content to a user in association with the user viewing a video content item during a session, can identify one or more candidate content formats, and can present the additional content. The user behavior predictor can predict a likelihood that the user will abandon the session for each candidate content format. The content format selector can select a format based at least in part on the predicting. The content timing selector can determine when to present the additional content to the user.

These and other embodiments may each optionally include none, one or more of the following features. Selecting the format can include selecting a format least likely to cause the user to abandon the session. Determining when to present the additional content can include determining to withhold the additional content based at least in part on the predicting. Predicting a likelihood that the user will abandon the session can include determining whether the likelihood is above a predetermined threshold, and presenting the additional content may only occur if the likelihood is below the predetermined threshold. Selecting the format can be based at least in part on the video content item being viewed in the session. Selecting the format can be based at least in part on a measured satisfaction of the user. Selecting the format can be based at least in part on current and historical session data. The current and historical session data can include data related to viewed video content items, user interaction with video content items, additionally presented content, user interaction with additionally presented content, and session abandonment. The candidate content formats can be selected from pre-video, post-video, in stream, overlay, and banner format types.

Particular embodiments of the subject matter described in this specification may be implemented to realize none, one or more of the following advantages. A systemic data-driven approach to making video content formatting decisions can be employed for dynamically customizing content delivery for a particular user. By predicting when users may be receptive to certain types of content during a video playback session, user satisfaction may be increased, thereby increasing user loyalty to a content delivery platform and maintaining long-term revenue.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

Like reference symbols in the various drawings indicate like elements.

DETAILED DESCRIPTION

In general, computer systems can present content to users. Users can request video content for presentation on their display devices, and additional content (e.g., advertising content) may be selected for presentation in association with the video content. As some additional content formats (e.g., pre-video, post-video, in stream, overlay, banner, and other content formats) may be considered by the user as more intrusive than others, a systematic data-driven approach can be employed for making decisions regarding whether to present the additional content, when to present the additional content, and the format of the additional content. For example, various candidate content formats can be identified, and user interest in receiving additional content of each format type can be predicted using current and historical session data. By including predicted user preference as a factor in selecting and presenting additional content, for example, a video content presentation platform may maintain or increase user satisfaction while maintaining revenue gained from presenting the additional content.

The systems discussed here may provide one or more mechanisms for collecting information about users. Users may be provided with an opportunity to opt in/out of programs that may collect personalized information. For example, a user may receive notice of what data may be collected and how such data may be used or retained, subject to the user's express permission. In addition, certain data may be anonymized in one or more ways before it is stored or used, so that personally identifiable data is removed.

Figure 1:
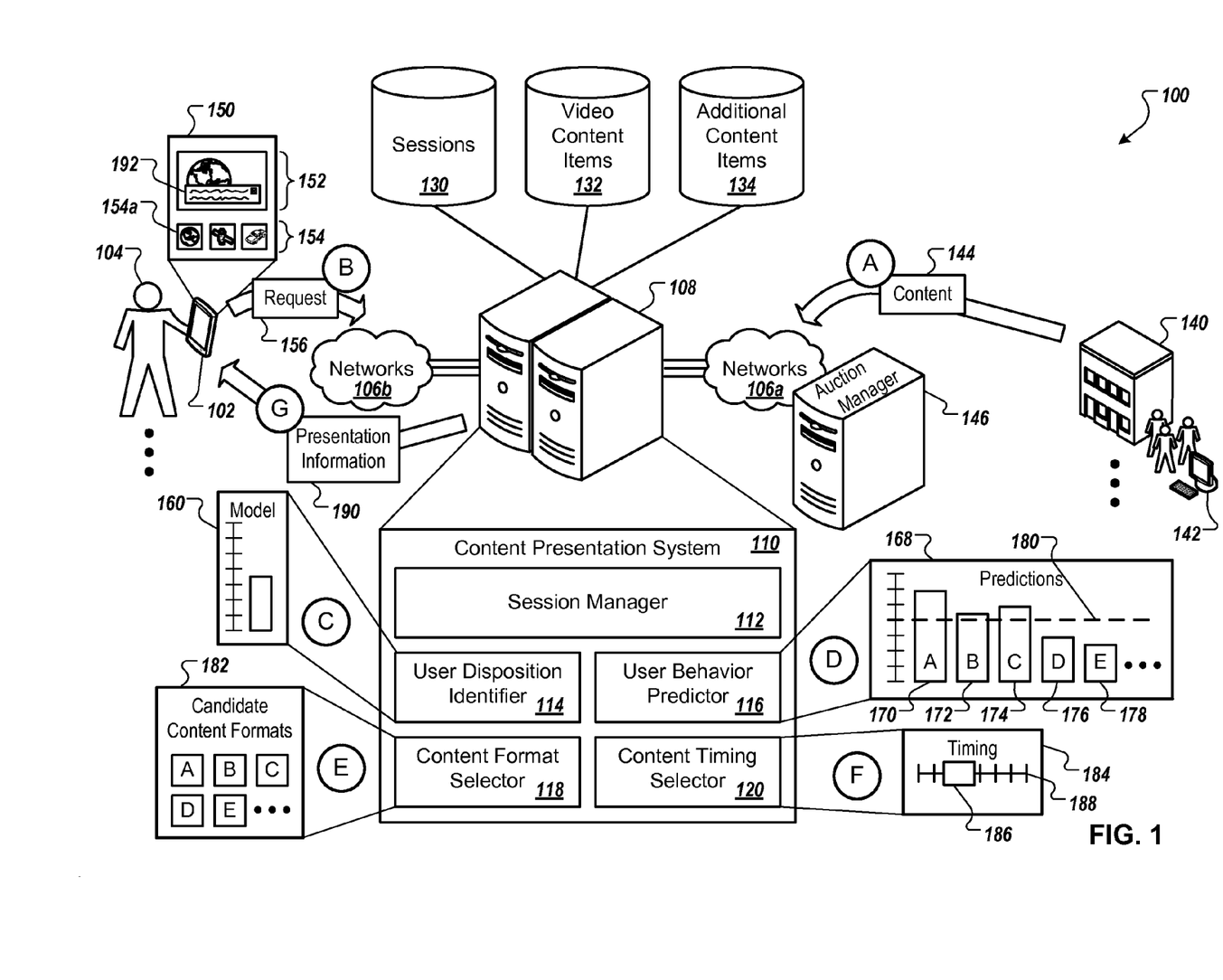
FIG. 1 is a diagram of an example system that can present content to users in association with video content.

FIG. 1 is a diagram of an example system 100 that can present content to users in association with video content. FIG. 1 also illustrates an example flow of data within the system 100 during states (A) to (G), where the states (A) to (G) may occur in the illustrated sequence, or they may occur in a sequence that is different than in the illustrated sequence. For example, two or more of the states (A) to (G) may occur concurrently.

In further detail, the system 100 includes one or more client computing devices 102 (each operated by a corresponding user 104) that communicate over one or more networks 106 with one or more computing servers 108. The networks 106 may include a wireless cellular network, a wireless local area network (WLAN) or WiFi network, a Third Generation (3G) or Fourth Generation (4G) mobile telecommunications network, an intranet, the Internet, or any other suitable network or any appropriate combination thereof.

The client device(s) 102 may be any suitable type of computing device (e.g., mobile phone, smart phone, personal digital assistant, tablet computer, laptop or desktop computer, or other stationary or portable device) that includes one or more processors and computer readable media. Among other components, for example, the client device(s) 102 includes one or more processors, computer readable media that store software applications, input device(s) (e.g., touch screens, keyboards, computer mice, motion sensors, microphones, and the like), output device(s) (e.g., display screens, speakers, and the like), and communications interfaces.

The computing server(s) 108 may be configured to execute application code associated with a variety of software components (e.g., modules, objects, libraries, services, and the like), including computer instructions to perform some or all of the method steps described below. In some implementations, the computing server(s) 108 may include one or more components of a content presentation system 110 described below.

The content presentation system 110 can provide content (e.g., video, graphics, audio, text, etc.) to users 104, for example, and can include a session manager 112, a user disposition identifier 114, a user behavior predictor 116, a content format selector 118, and a content timing selector 120. Two or more of the components 112, 114, 116, 118, and 120 may be implemented on the same device (e.g., same computing device), or on different devices, such as devices included in a server farm or a peer-to-peer network. The content presentation system 110 and server(s) 108 can be in communication with one or more data storage devices, including a sessions data store 130, a video content items data store 132, and an additional content items data store 134. The data stores 130, 132, and 134 can implement databases, file systems, and the like to add, remove, and maintain data used by the system 100.

Referring to the example flow of data, during state (A), entities (e.g., businesses, organizations, individuals, etc.) can provide content to the content presentation system 110. For example, an entity 140 can employ a client computing device 142 to provide content 144. The content 144 may include video content and/or additional content (e.g., advertisements) for presentation to the user(s) 104. For an advertising campaign, for example, the entity 140 may provide content 144 including one or more advertising-related content items. Content items provided by entities may include content of varying substance and/or format, such as short videos, long videos, videos directed to particular user demographic groups, graphics, audio, text, web links, and other sorts of content items.

In the present example, the content 144 may be received by the computing server(s) 108 and the content presentation system 110 via the networks 106a. Upon receiving the content 144, for example, the content presentation system 110 can store video content to be presented to users at the video content items data store 132. Additional content items, such as video and non-video advertisements and other sorts of content, for example, can be stored at the additional content items data store 134. In some implementations, additional content items may be generated based on content provided by entities. For example, the content presentation system 110 can use a graphic and a web link included in the content 144 to generate a banner content item. As another example, the content presentation system 110 can use the web link and text included in the content 144 to generate an overlay content item.

In some implementations, entities may provide a bid for having additional content presented to users in association with video content. For example, the entity 140 can provide a bid in association with the content 144, and/or a bid in association with one or more content items included in the content 144. Upon receiving the content 144 and the bid, for example, the content presentation system 110 can provide content and bid information to an auction manager or reservation manager 146 for use in running an auction or supporting a reservation based content distribution system.

During state (B), users can request video content. To request video content, for example, the user 104 can use the client device 102 to interact with an interface 150 (e.g., a web page) including a video content presentation area 152 and various controls 154 for selecting video content items. In the present example, the user interacts with (e.g., clicks) the control 154a to select a video content item about "world news". The interface 150 can detect the selection, for example, and the client device 102 can provide a request 156 for the selected content item.

In the present example, the request 156 may be received by the computing server(s) 108 and the content presentation system 110 via the networks 106*a*. Upon receiving the request 156, for example, the content presentation system 110 can employ the session manager 112 to handle the request 156 and to identify user interactions associated with the request. During a video viewing session, for example, the user 104 may request various video content items, and may interact with the video content items and with additional content items in various ways. For example, while viewing a video content item, the user 104 may terminate presentation of the content item and may request a different content item. As another example, the user 104 may be presented with an additional content item such as a graphical or text-based advertisement superimposed over the video content item, and may dismiss the advertisement. As another example, the user 104 may abandon the session. The session manager 112, for example, can receive information about video content items and additional content items presented to users, including information about user interactions with content items during video viewing sessions.

In some implementations, historical session data may be stored, maintained, and referenced. For example, upon receiving express permission of the user 104, the content presentation system 110 can maintain a history of the user's interactions with video content items and additional content items at the sessions data store 130. Upon receiving identification information from the user 104 (e.g., as part of a login process), the session manager 112 can identify the user 104 and can reference current and historical session data associated with the user. Thus, for example, short-term and long-term patterns of user interaction with video content and additional content items may be identified for particular users, for particular user groups (e.g., users associated with certain demographic categories), and for users in general.

During state (C), user disposition can be identified for a video viewing session. For example, the content presentation system 110 can employ the user disposition identifier 114 to identify the disposition of the user 104 in regard to his or her current video viewing session. To identify user disposition, for example, the session manager 112 can provide data related to the user's current session and/or past sessions to the user disposition identifier 114. User disposition identification may be based on various factors, such as which videos a user has requested during a current session, metadata about the videos (e.g., content, length, ratings), user interactions with the videos (e.g., terminating videos to watch different videos, pausing videos, skipping to different video sections, etc.), the sequence of videos, additional content the user has been presented with in association with the videos, how the user arrived at a video presentation platform (e.g., search, a link, an embedded video), and other user signals (e.g., user profile information). Based on user signals and on current and historical session signals, for example, the user disposition identifier 114 can generate a user model 160. Disposition information associated with the model 160, for example, can be used as a factor for generating predictions regarding user likelihood of continuing or abandoning a video viewing session. Users of a positive disposition, for example, may generally be more likely than users of a negative disposition to continue a video viewing session upon being presented with additional content. In the present example, the model 160 may be used to gauge that the user 104 is of a particular disposition (e.g., moderate disposition) in regard to his or her current video viewing session, and may be amenable to being presented with particular types of additional content in association with the currently requested video content item.

During state (D), user behavior can be predicted in regard to being presented with additional content. For example, the user behavior predictor 116 can receive user disposition information associated with the model 160 and can generate one or more predictions 168 of user behavior in regard to receiving additional content of various formats, based at least in part on the user disposition information. In the present example, the predictions 168 generated by the user behavior predictor 116 may include likelihoods that the user 104 will abandon his or her current video viewing session upon receiving additional content of candidate content formats 170 ("Format A"), 172 ("Format B"), 174 ("Format C"), 176 ("Format D"), and 178 ("Format E"). Formats "A" through "E", for example, may respectively represent pre-video, post-video, in stream, overlay, and banner format types, however, more or fewer content format types may be considered. In the present example, the user behavior predictor 116 can determine whether the likelihood that the user 104 will abandon his or her current video viewing session is above or below a predetermined threshold 180 (e.g., 10%, 20%, 30%, or another suitable probability) if presented with additional content of formats "A" through "E". Considering formats "A" (e.g., pre-video), "B" (e.g., post-video), and "C" (e.g., in stream), for example, the user behavior predictor 116 may determine that the likelihood the user 104 will abandon his or her current video viewing session is above the threshold 180. Considering formats "D" (e.g., overlay) and "E" (e.g., banner), for example, the user behavior predictor 116 may determine that the likelihood the user 104 will abandon his or her current video viewing session is below the threshold 180.

During state (E), a format can be selected for the additional content. For example, the content format selector 118 can use information provided by the user behavior predictor 116 to select from candidate content formats 182 (e.g., formats "A" through "E") for presentation of additional content to the user 104. In some implementations, a content format may be selected for additional content based at least in part on whether the likelihood a user will abandon his or her current video session is over or under a predetermined threshold. For example, as the user behavior predictor 116 has determined that the likelihoods the user 104 will abandon his or her current session if presented with additional content of formats "A", "B", and "C" are above the predetermined threshold 180, the content format selector 118 may remove these formats from consideration. As the likelihoods that the user 104 will abandon his or her current session if presented with additional formats "D" and "E" are below the predetermined threshold 180, for example, the content format selector 118 may consider these formats for presentation.

In some implementations, a format selection for additional content may include selecting a format that is least likely to cause session abandonment. In the present example, as the candidate content format 178 (e.g., "Format E", a banner format) is associated with the lowest likelihood of session abandonment of the formats under consideration, the content format selector may select "Format E". If the likelihoods of session abandonment for each of the candidate content formats 182 were above the predetermined threshold 180, for example, the content format selector 118 may determine to withhold additional content while the content presentation system 110 provides video content associated with the current request 156.

In some implementations, a format selection for additional content may be based in part on auction bid information provided by entities for having additional content presented to users in association with video content. For example, the entity 140 may have provided content 144 including additional content of "Format D" (e.g., overlay) and "Format E" (e.g., banner), and including bids associated with each content format. As the likelihood of session abandonment by the user 104 upon receiving additional content of either "Format D" or "Format E" is below the predetermined threshold 180 in the present example, bid information associated with each of the formats may be used as a factor in selecting a content format.

In some implementations, a content format associated with a winning bid may be selected, for content formats identified as being below a threshold of likely abandonment. For example, if the auction manager 146 determines that a bid for presenting additional content of "Format D" (e.g., overlay) prevails over a bid for presenting additional content of "Format E" (e.g., banner), "Format D" may be selected, even though the likelihood of user abandonment for the current video session for "Format D" is somewhat higher than that of "Format E". In some implementations, a weighting technique may be used to balance potential session abandonment, cost factors, and other factors (e.g., other quality factors associated with fulfilling an available content delivery slot). For example, a formula including parameters for abandonment probabilities, bid amounts, and additional content quality may be used by the content format selector 118 to determine a selection of "Format D" or "Format E" for additional content to be presented to the user 104.

During state (F), when to present additional content can be determined. For example, the content timing selector 120 can determine a timing 184 for presenting additional content included in the content 144 provided by the entity 140. Some content formats may be associated with particular presentation times. For example, presentation of additional content of a pre-video format may occur immediately before presentation of a video content item. As another example, presentation of additional content of a post-video format may occur immediately after presentation of a video content item. Some content formats may be associated with variable presentation times. For example, presentation of additional content of an overlay format may occur at any time between the beginning and the end of presentation of a video content item, and may occur for a particular duration. In the present example, the content format selector 118 may select "Format D" (e.g., an overlay format) for presentation of an additional content item to the user 104, and the content timing selector 120 may determine a window 186 of time for beginning and ending presentation of the additional content item, within the bounds of a timeframe 188 for presenting video content. The window 186 of time, for example, may be based on user disposition information, predicted user behavior, and user interaction with similar content.

During state (G), additional content can be provided in accordance with a selected format. For example, the computing server(s) 108 and the content presentation system 110 can provide presentation information 190 to the client device 102 via networks 106*b*. The presentation information 190, for example, may include video content (e.g., a video content item about "world news" that is associated with the control 154*a* selected by the user 104 and provided by the additional content items data store 130), additional content (e.g., an overlay advertisement based on information provided by the entity 140 and selected by the content presentation system 110), and timing information (e.g., a start and/or end time for presenting the overlay advertisement within the context of the video content item). Upon receiving the presentation information 190, for example, the client device 102 can present the video content within the video content presentation area 152. As the video content plays, for example, the client device 102 can present additional content 192 (e.g., the overlay advertisement), for example, using the timing information to present the additional content within the window 186 of time determined by the content timing selector 120.

In some implementations, information about user interaction with video content and/or additional content may be used to maintain session data models. For example, the user 104 may allow the additional content 192 to be presented for its duration, or may choose to end presentation of the additional content before completion by closing or skipping the content. In the present example, information about interaction of the user 104 with the additional content 192 can be provided to the computing server(s) 108 and the content presentation system 110 by the client device 102. Upon receiving the information, for example, the session manager 112 can update the sessions data store 130 and/or the user model 160. If the user 104 closes or skips the additional content 192 upon being presented with such content, for example, the session manager 112 may adjust the user model 160 to reflect, for example, a worsening user disposition. As another example, if the user 104 allows the video content and the additional content 192 to play in its entirety, the session manager 112 may adjust the user model 160 to reflect a stable or receptive user disposition. As another example, if the user 104 favorably rates the video content and/or follows a link associated with the additional content 192, the session manager 112 may adjust the user model 160 to reflect an improving user disposition. Thus, as the circumstances of a user's video viewing session may change, decisions about the format and timing of additional content to be presented to the user may be dynamically adjusted to reflect the user's current disposition and historical viewing patterns.

Figure 2:
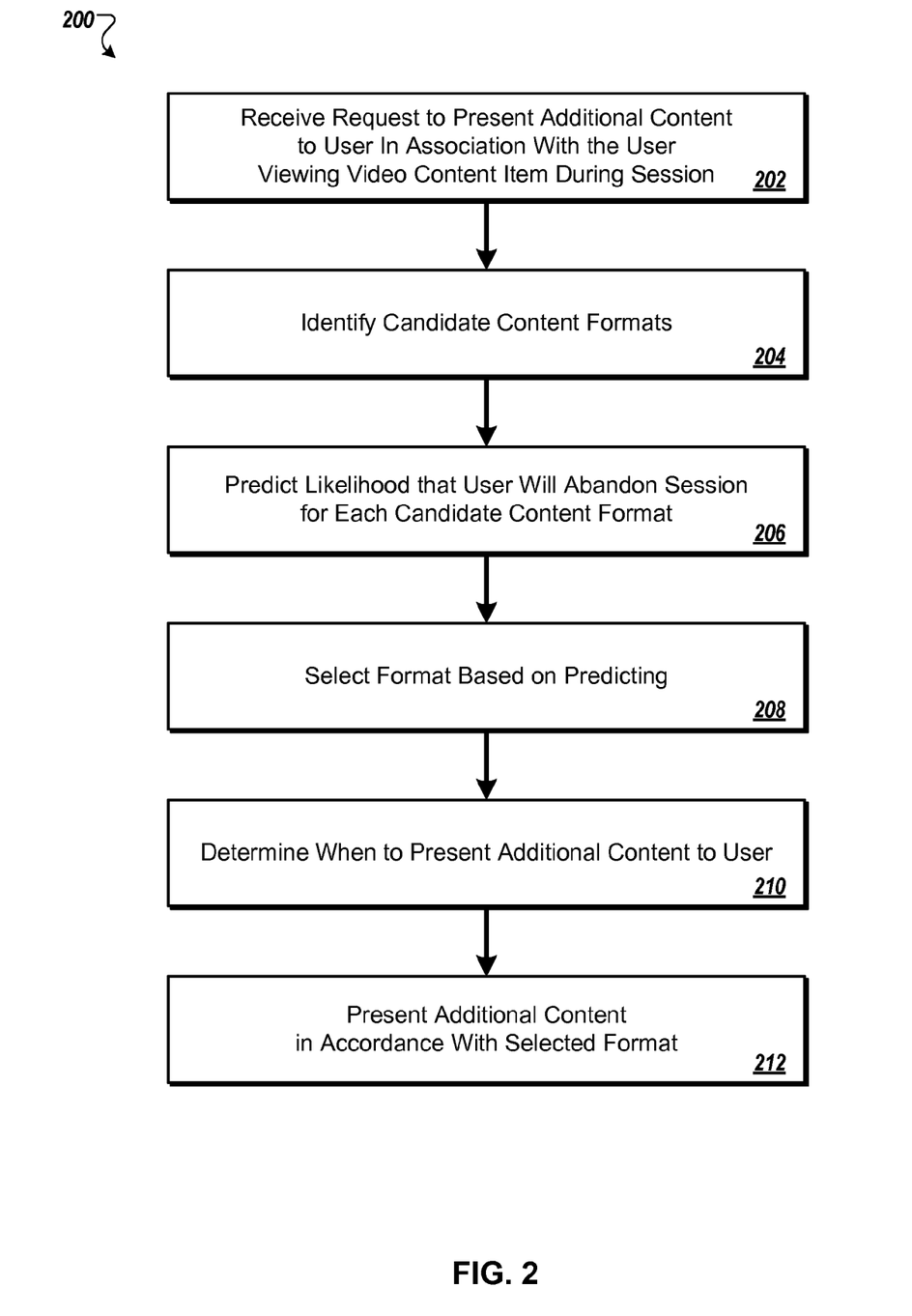
FIGS. 2-4 are flowcharts of example processes for presenting content to users in association with video content.

FIG. 2 is a flowchart of an example process 200 for presenting content to users in association with video content. In some implementations, the process 200 may be performed by the system 100 and will be described as such for the purpose of clarity. Briefly, the process 200 includes receiving a request to present additional content to a user in association with the user viewing a video content item during a session, identifying candidate content formats, predicting a likelihood that the user will abandon the session for each candidate content format, selecting a format, determining when to present additional content to the user, and presenting additional content in accordance with the selected format.

A request can be received (202) to present additional content to a user in association with the user viewing a video content item during a session. Referring to FIG. 1, for example, the content presentation system 110 can receive a request to present additional content to the user 104 in association with the user 104 viewing video. For example, the user 104 can employ the interface 150 executed by the client device 102 to select the control 154*a* for playing a video content item related to "world news", and the content presentation system 110 may identify the video content item as a sponsored item. One or more candidate content formats can be identified (204). Upon receiving the request to present additional content to the user 104, for example, the content presentation system 110 can identify the candidate content formats 182, including pre-video, post-video, in stream, overlay, banner, and other suitable content format types.

A likelihood that the user will abandon the session can be predicted (206) for each candidate content format. For example, the content presentation system 110 can employ the user behavior predictor 116 to predict likelihoods that the user 104 will abandon his or her current session for each of the candidate formats 170 (e.g., "Format A", a pre-video format), 172 (e.g., "Format B", a post-video format), 174 (e.g., "Format C", an in stream format, 176 (e.g., "Format D", an overlay format), and 178 (e.g., "Format E", a banner format). More or fewer suitable content format types may also be considered. Predicting user behavior regarding potentially being presented with additional content may be based various factors, such a user's profile, the user's current session, past sessions of the user, past sessions of other users, requested video content, and/or additional content.

In some implementations, predicting a likelihood that the user will abandon the session may include determining whether the likelihood is above a predetermined threshold, and presenting additional content only occurs if the likelihood is below the predetermined threshold. For example, the user behavior predictor 116 may determine that the likelihood that the user 104 will abandon his or her current session upon being presented with an additional content item of format 170 (e.g., "Format A", a pre-video format) is above the predetermined threshold 180 (e.g., above 10%, 20%, 30%, or another suitable percent chance). Thus, in the present example, the content presentation system 110 may elect to not present additional content of format 170. As another example, the user behavior predictor 116 may determine that the likelihood that the user 104 will abandon his or her current session upon being presented with an additional content item of format 178 (e.g., "Format E", a banner format) is below the predetermined threshold 180. Thus, the content presentation 110 may elect to present additional content of format 178, for example.

A format can be selected (208), based at least in part on the predicting. For example, the content presentation system 110 can employ the content format selector 118 to select a content format from the candidate content formats 182. Various techniques may be employed for selecting a content format, including considering session abandonment probabilities for users in regard to potentially being presented with various content formats, and including other considerations, such as financial factors (e.g., auction bids for presenting additional content) and quality factors (e.g., characteristics of the video content and/or additional content).

In some implementations, selecting the format may include selecting a format least likely to cause the user to abandon the session. For example, considering probabilities that the user 104 will abandon his or her current session upon being presented with each of the content formats 170, 172, 174, 176, and 178, the content format selector 118 may select content format 178 (e.g., "Format E", a banner format), as the likelihood for abandonment for such a format is less than that of formats 170, 172, 174, and 176.

In some implementations, selecting the format may be based at least in part on a measured satisfaction of the user. As discussed above, user satisfaction can be measured by the user disposition identifier 114, and may be based on various factors, such as the videos and additional content a user has been presented with during a current session, user interactions with the videos and additional content, how the user arrived at a video presentation platform, and other signals such as user profile information. Considering the user model 160, for example, the user disposition identifier 114 may determine that the user 104 is of a moderate disposition in regard to his or her current video viewing session. Thus, in the present example, the content format selector 118 may select an additional content item that is of an unobtrusive (e.g., a banner format) or a semi-intrusive format (e.g., an overlay format, etc.) as opposed to an additional content item of an intrusive format (e.g., pre-video, post-video, in stream, etc.). By presenting additional content of a certain format when users may be receptive to such content, for example, user frustration with additional content may be reduced during a video viewing session, thereby maintaining user satisfaction while maintaining revenue.

A level of obtrusiveness of additional content formats may reflect a degree to which a user's video viewing experience is affected, for example. Unobtrusive formats, for example, may include formats for presenting additional content in which the additional content is presented outside (e.g., above, below, to the side, etc.) of the video content presentation area 152, and in which the presentation of additional content does not interfere with (e.g., delay or occlude) the presentation of video content. Semi-obtrusive formats, for example, may include formats for presenting additional content in which the additional content is presented inside of the video content presentation area 152 (e.g., overlaid, superimposed, etc.), and in which the presentation of additional content does not interfere with the presentation of video content. Obtrusive formats, for example, may include formats for presenting additional content in which the additional content is presented inside of the video content presentation area 152, and in which the presentation of additional content interferes with the presentation of video content. For example, presenting additional content of an obtrusive format may include delaying or interrupting presentation of video content as the additional content is presented.

In some implementations, selecting the format may be based at least in part on the video content item being viewed in the session. For example, the content format selector 118 may consider information associated with the video content item currently being viewed by the user 104, such as the sequence of viewing, subject matter, length, quality, rating, and other video metadata, when selecting from the candidate content formats 182. For low quality and/or poorly rated video items, for example, the content format selector 118 may select additional content items of an unobtrusive or semi-obtrusive format. As another example, for videos items of a particular format (e.g., long format, high definition, etc.) of interest to a particular user (e.g., based on a user profile), a semi-obtrusive or obtrusive format may be selected, depending on the sequence of viewing in the user's current session.

In some implementations, selecting the format may be based at least in part on current and historical session data. Current and historical session data may include data related to viewed video content items, user interaction with video content items, additionally presented content, user interaction with additionally presented content, and session abandonment. For example, the content format selector 118 may consider historical behavior of the user 104 when presented with video content items similar to the video content item currently being viewed. If the user 104 has historically continued a viewing session after being presented with a similar video content item, for example, the user behavior predictor 116 may predict that the user 104 is likely to continue his or her video viewing session regardless of being presented with additional content, and the content format selector 118 may select an additional content item of a semi-obtrusive or obtrusive format.

When to present the additional content to the user can be determined (210). For example, the content presentation system 110 can employ the content timing selector 120 to determine when to present additional content to the user 104 in association with a requested video content item. The content timing selector 120, for example, can determine to present additional content before, during, and/or after presentation of a video content item. For an additional content item presented during presentation of a video content item, for example, a start time and/or end time for presenting the additional content item can be determined relative to the timeframe for presenting the video content item. For example, an additional content item such as an overlay advertisement may be scheduled to begin ten seconds after the start of a video content item, and to continue for a specified time period (e.g., thirty seconds), to continue for the duration of the video content item, or to continue until closed by the user.

In some implementations, determining when to present the additional content may include determining to withhold the additional content based at least in part on the predicting. For example, if the user behavior predictor 116 were to predict that the user 104 may abandon his or her current session (e.g., within a certain probability) if presented with additional content in association with viewing a requested video content item, the content presentation system 110 may withhold the additional content. If the user 104 continues his or her video viewing session, for example, the user disposition identifier 114 and/or the user behavior predictor 116 may continually reevaluate the user's disposition and likelihood of session abandonment for additional content formats, based on further video content requested by the user 104 and based on user behavior. At some later point in the user's 104 session, for example, the user's disposition may be identified as having improved, and the user may be predicted to be receptive to receiving additional content of one or more formats.

The additional content can be presented (212) in accordance with the selected format. For example, the content presentation system 110 can receive the video content item requested by the user 104 (e.g., video content associated with the selected control 154*a*) from the video content items data store 132. Moreover, the content presentation system 110 can receive and/or generate additional content of the format selected by the content format selector 118 from data provided by the additional content items data store 134. Upon receiving and/or generating such content, for example, the content presentation system 110 can provide the content to the client device 102. The presentation information 190, for example, may include video content requested by the user 104, additional content of a format selected by the content format selector 118, and timing information determined by the content timing selector 120 for presenting the additional content.

Figure 3:
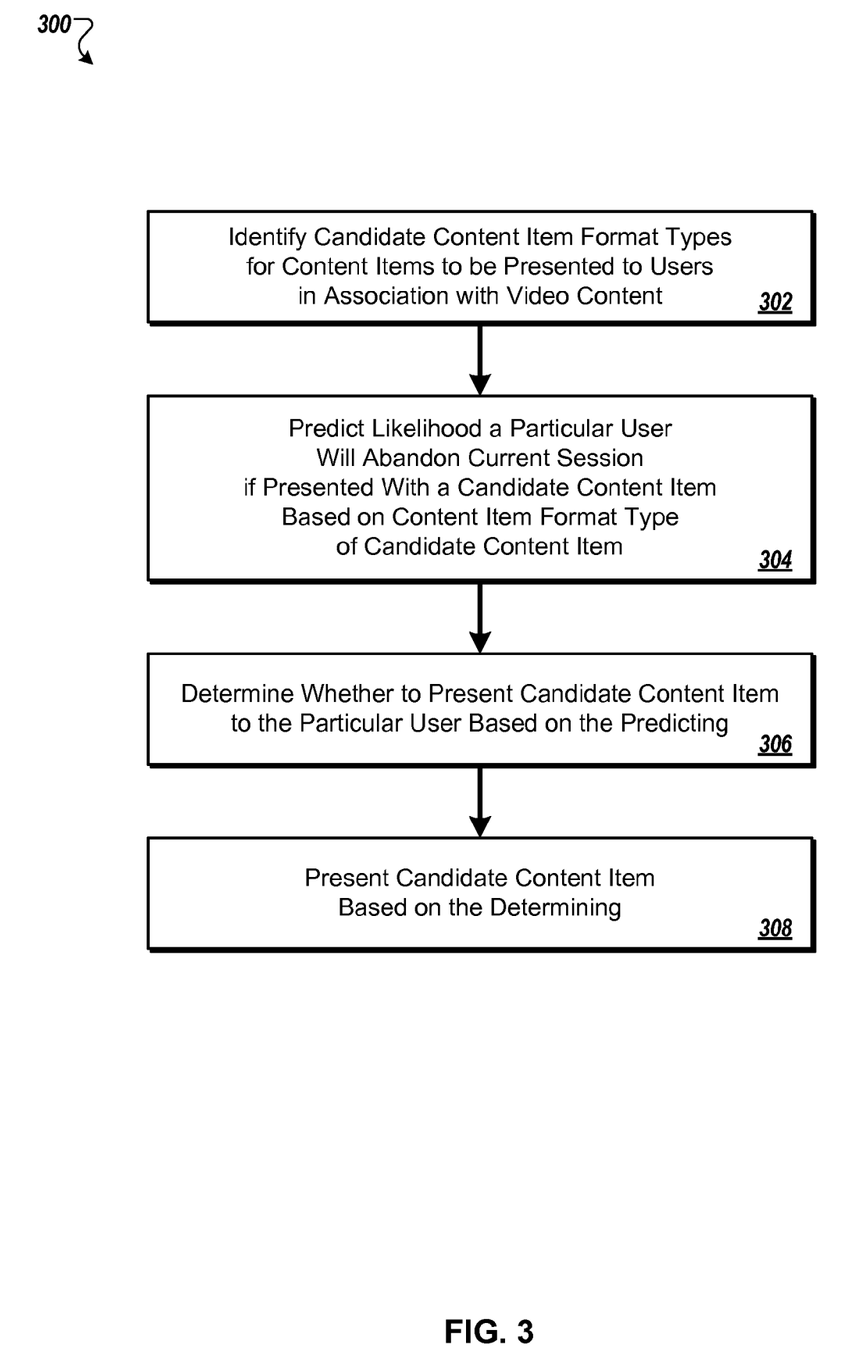

FIG. 3 is a flowchart of an example process 300 for presenting content to users in association with video content. In some implementations, the process 300 may be performed by the system 100 and will be described as such for the purpose of clarity. Briefly, the process 300 includes identifying candidate content item format types for content items to be presented to users in association with video content, predicting a likelihood a particular user will abandon a current session if presented with a candidate content item based on the format type of the candidate content item, determining whether to present the candidate content item to the particular user, and presenting the candidate content item.

One or more candidate content item format types can be identified (302) for content items to be presented to the user in association with video content. Referring to FIG. 1, for example, the content presentation system 110 can identify and/or generate additional content based on data provided by the additional content items data store 134. Additional content items (e.g., advertisements) identified and/or generated by the content presentation system 110 may include content of various formats, such as pre-video, post-video, in stream, overly, banner, and other suitable format types.

A likelihood a particular user will abandon a current session if presented with a candidate content item can be predicted (304), based at least in part on the content item format type of the candidate content item. For example, the content presentation system 110 can employ the user behavior predictor 116 to generate one or more predictions 168 including likelihoods that the user 104 will abandon his or her current video viewing session upon being presented with various additional content items of various content item format types. In some implementations, user models and/or session models may be used for predicting user behavior. To generate the model(s), for example, user and session signals may be extracted from data related to a current session and/or from historical session data provided by the sessions data store 130. The signals may be provided to one or more machine learning algorithms, for example, that can be used to train predictor models for making predictions of user behavior based on current circumstances and on historical patterns. In some implementations, linear regression modeling techniques and/or user group clustering techniques may be used to build predictor models.

One example predictor model may be represented as: P(Stay|Additional Content Item, Content Format, Session Features, Other Features). Inputs to the example predictor model may include a content format of an additional content item, session features, and other features. As discussed above, content formats may include pre-video, post-video, in stream (skippable and non-skippable), overlay, banner, and other suitable content formats. Session features, for example, may include session-related data such as a number and type of video content items viewed, a number and type of additional content items presented, user interaction with the video content items and/or the additional content items, and other data related to a current video viewing session. Other features, for example, may include historical session features and user features, playback context (e.g., embedded player, mobile device, television, etc.), and external features such as current weather conditions, topics of interest currently tracking on various news feeds, the time of day, the day of week, etc. The predictor, may return a continuous value between one (user stays and continues session) and zero (user abandons session), for example, indicative of a likelihood that a user will continue or abandon his or her current session when presented with a particular additional content item (e.g., an advertisement) of a particular content format.

Whether to present the candidate content item to the particular user can be determined (306), based at least in part on the predicting. For example, the content format selector 118 can determine whether to present an additional content item of a particular format, based at least in part on whether the likelihood a particular user will abandon his or her current session upon being presented with the additional content item is above or below a predetermined threshold of session abandonment. If the likelihood is above the threshold, for example, the content format selector 118 may withhold the additional content item from presentation. If the likelihood is below the threshold, for example, the content format selector 118 may select the additional content item for presentation.

The candidate content item can be presented (308), based at least in part on the determining. If a determination is made to present an additional content item (e.g., an advertisement) of a particular format to a user, for example, the content presentation system 110 can provide video content, additional content of the determined format, and timing information to a device operated by the user for use in presentation. The additional content item, for example, may be provided in association with video content to be presented to the user.

Figure 4:
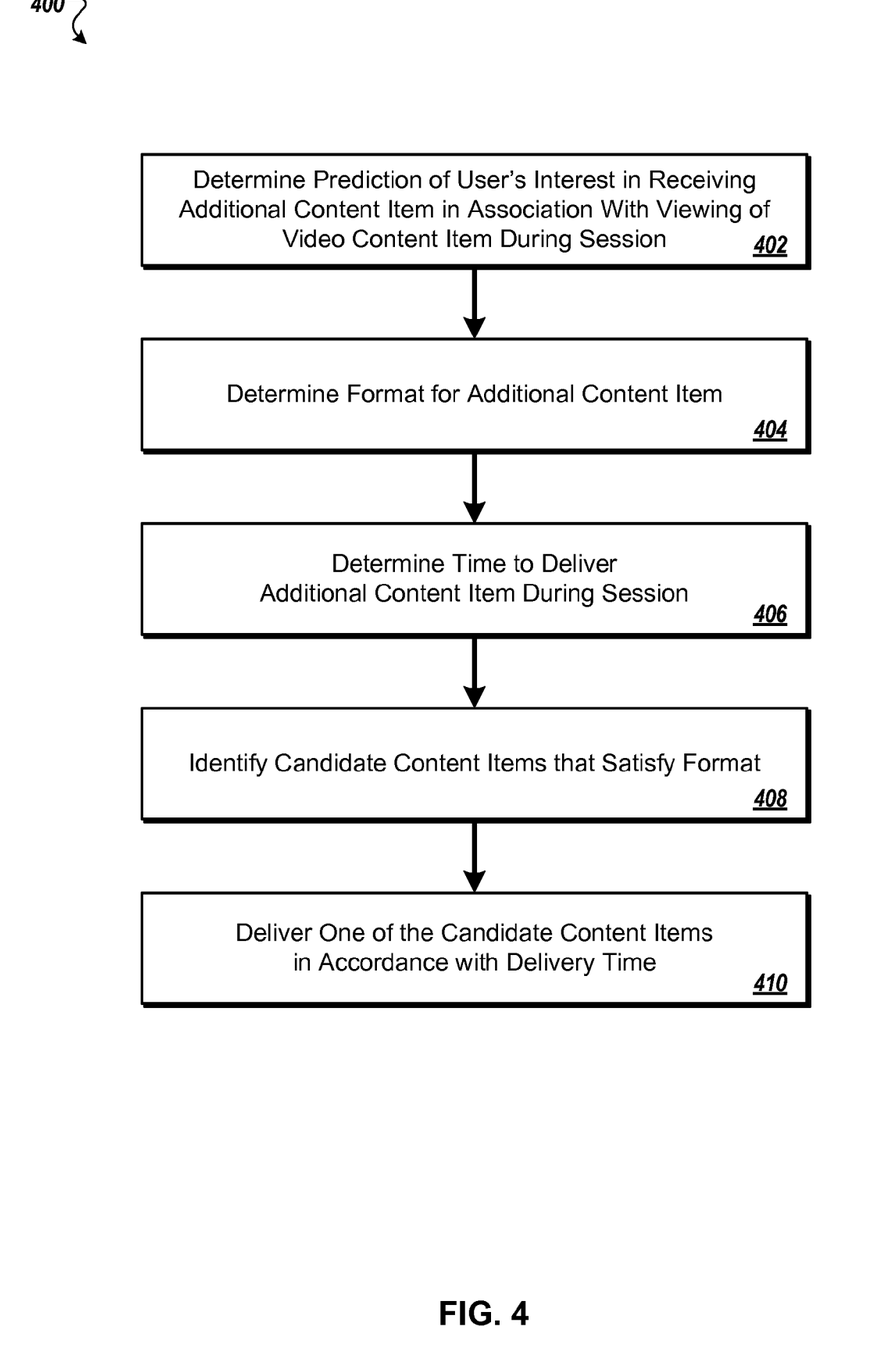

FIG. 4 is a flowchart of an example process 400 for presenting content to users in association with video content. In some implementations, the process 400 may be performed by the system 100 and will be described as such for the purpose of clarity. Briefly, the process 400 includes determining a prediction of a user's interest in receiving an additional content item in association with a viewing of a video content item during a session, determining an additional content item format, determining a time to deliver the additional content item during the session, identifying candidate content items that satisfy the format, and delivering one of the candidate content items in accordance with the delivery time.

A prediction of a user's interest can be determined (402) in receiving an additional content item in association with a viewing of a video content item during a session. Referring to FIG. 1, for example, the content presentation system 110 can determine a prediction of the user's 104 interest in receiving additional content during a video viewing session. To predict possible user interest in receiving additional content (e.g., advertising content), for example, the content presentation system 110 may maintain and refer to models for users, user groups, and current and historical user sessions as described above. For example, when a particular video is about to be viewed by a user, the models may be referenced by one or more prediction engines to predict a potential impact that presenting an additional content item may have on the user's current video viewing session. As the user's video viewing session progresses, for example, the user's interest in receiving additional content may fluctuate, and the content presentation system 110 can employ user models, session models, and user activity data to predict the fluctuations.

An additional content item format can be determined (404). For example, additional content items (e.g., advertisements) may be associated with various possible format types, such as pre-video, post-video, in stream, overlay, banner, and other suitable format types. Based at least in part on a predicted user interest in receiving additional content of a particular format, one of the possible format types may be selected. For example, the content presentation system 110 may consider formatting an additional content item as a type for which a user is predicted to continue his or her current session upon presentation of the content item. If the user is predicted to continue his or her current session upon receipt additional content of one or more available format types, for example, a format type may be selected. If the user is predicted to abandon his or her current session upon receipt of additional content of all available format types, for example, additional content may be withheld.

In some implementations, a determination of additional content format may be based at least in part on policy and/or financial considerations. For example, if a user is predicted to be more likely to abandon his or her current video viewing session upon receiving additional content of an obtrusive format (e.g., a video format) as opposed to receiving additional content of an unobtrusive format (e.g., a banner format) or semi-obtrusive format (e.g., an overlay format), the obtrusive format may be selected if an amount of revenue for presenting additional content of the obtrusive format is sufficiently greater (e.g., as a percentage or relative to) than that of the unobtrusive or semi-obtrusive format.

A time to deliver the additional content item during the session can be determined (406). For example, the content timing selector 120 can determine a time to deliver additional content to the user 104 relative to presentation of video content to the user. If the user 104 is scheduled to receive a video content item from the content presentation system 110, for example, the content timing selector 120 may determine a start time, an end time, and/or duration for presentation of additional content relative to the start of the video content.

One or more candidate content items that satisfy the format can be identified (408). For example, the content presentation system 110 can select and/or generate additional content of the format determined at step (406) from content data provided by the additional content items data store 134. If multiple entities 140 have provided additional content items of the determined format, for example, the content presentation system 110 can select one of the additional content items of the determined format type. Selection of an additional content item from content items of a similar format may be based on factors such as policy considerations, revenue considerations (e.g., bids submitted by content sponsors), and potential user appeal (e.g., based on a user profile and/or properties of an associated video content item).

One of the candidate content items can be delivered (410) in accordance with the delivery time. For example, the content presentation system 110 can provide video content, the selected additional content item of the determined format, and timing information for presenting the additional content item to the client device 102 operated by the user 104. As video content plays, for example, the additional content can be presented to the user 104 before, during, or after a particular video content item in accordance with the timing information.

Figure 5:
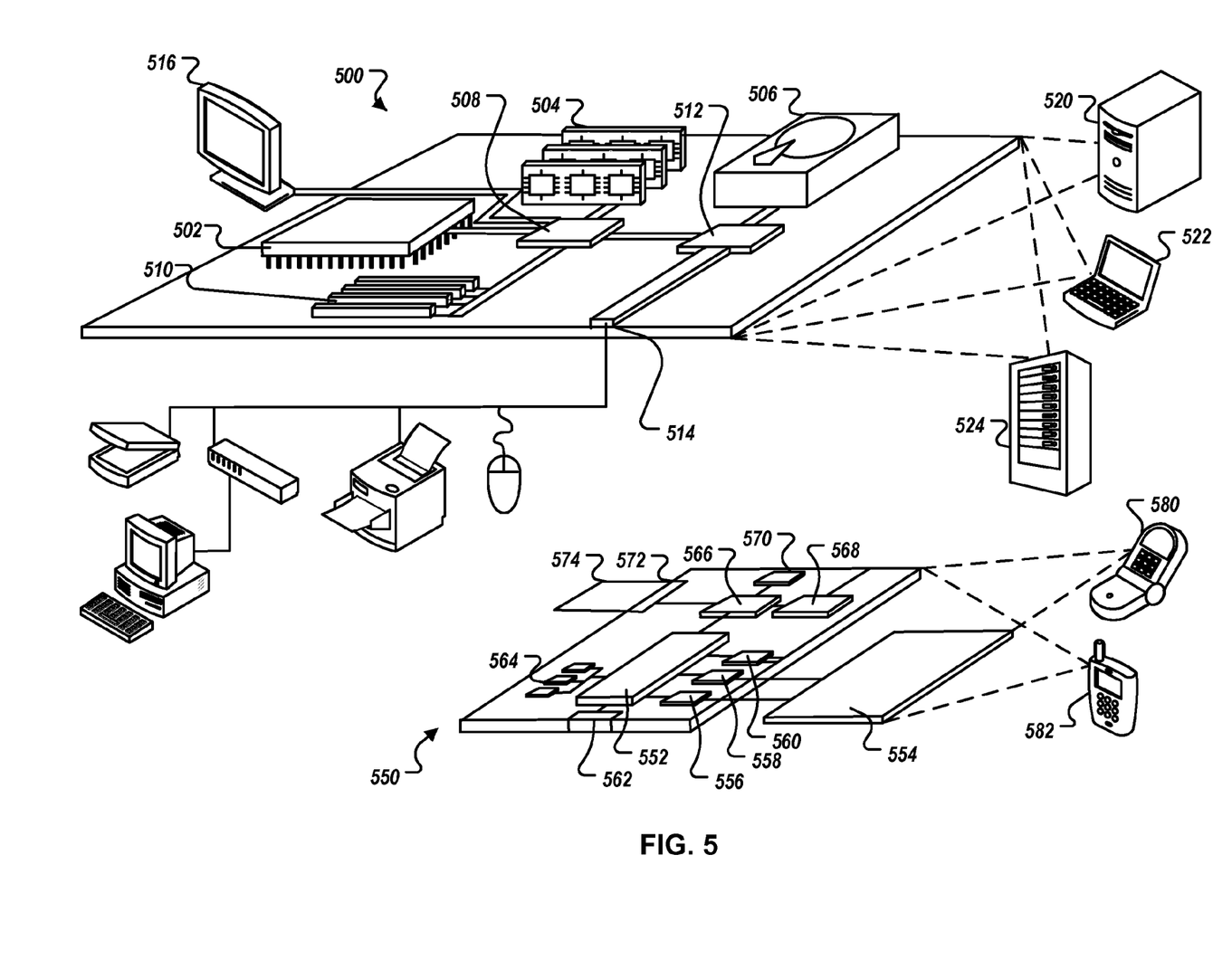
FIG. 5 shows an example of a computer device and a mobile computer device that can be used to implement the techniques described herein.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:

receiving, at one or more processors of a computing server from a client device, a request for advertising content to present to the client device during playback of video content;

identifying, by the one or more processors, a first candidate content item format type and a second candidate content item format type, the first candidate content item format type and the second candidate content item format type selected from a group consisting of pre-video, post-video, in stream, overlay, and banner advertising format types;

identifying, by the one or more processors, a user disposition for a current video viewing session based on historical data of previous advertising content presented to the client device, the current video viewing session comprising the playback of the video content and presentation of the advertising content;

predicting, by the one or more processors, for the first candidate content item format type based on the user disposition, a first likelihood that a user of the client device will abandon the current video viewing session prior to completion of the current video viewing session in response to presentation of advertising content of the first candidate content item format type;

predicting, by the one or more processors, for the second candidate content item format type based on the user disposition, a second likelihood that the user of the client device will abandon the current video viewing session prior to completion of the current video viewing session in response to presentation of advertising content of the second candidate content item format type;

determining, by the one or more processors, that the first likelihood is less than the second likelihood;

selecting, by the one or more processors based on the determination, the first candidate advertising format type for presentation of a content item to the client device; and presenting, by the one or more processors, the content item to the client device in accordance with the first candidate advertising format type.

2. The computer-implemented method of claim 1, further comprises determining that the first likelihood is below a predetermined threshold.

3. The computer-implemented method of claim 2, further comprising determining to withhold a second content item of the second candidate format type based on a determination that the second likelihood is greater than the predetermined threshold.

4. The computer-implemented method of claim 2, wherein determining that the first likelihood is below the predetermined threshold includes determining that the first candidate content item format type is not likely to cause the user to abandon the current video viewing session.

5. The computer-implemented method of claim 1, wherein selecting the content item of the first candidate advertising format type is based on the video content.

6. The computer-implemented method of claim 1, wherein identifying the user disposition is further based on current and historical session data including data related to previous video content presented to the client device, interaction by the user with the previous video content presented to the client device, previous advertising content presented to the client device, interaction by the user with the previous advertising content, and abandonment of previous video viewing sessions by the user.

7. The method of claim 1, further comprising:
identifying, by the one or more processors, a second user disposition for the current video viewing session based on historical data of previous advertising content presented to the client device;
predicting, by the one or more processors, for the first candidate content item format type based on the second user disposition, a third likelihood that the user will abandon the current video viewing session prior to completion of the current video viewing session in response to presentation of advertising content of the first candidate content item format type;
predicting, by the one or more processors, for the second candidate content item format type based on the second user disposition, a fourth likelihood that the user will abandon the current video viewing session prior to completion of the current video viewing session in response to presentation of advertising content of the second candidate content item format type;
selecting, by the one or more processors based on the third likelihood exceeding the fourth likelihood, the second candidate advertising format type for presentation of a second content item to the client device; and
presenting, by the one or more processors, the second content item to the client device in accordance with the second candidate advertising format type.

8. A computer-implemented method comprising:
identifying, by one or more processors of a computing server, a first candidate content item format type and a second candidate content item format type for advertising content to be presented to a client device during playback of video content, the first candidate content item format type and the second candidate content item format type selected from a group consisting of pre-video, post-video, in stream, overlay, and banner advertising format types;
identifying, by the one or more processors, a user disposition for a current video viewing session based on historical data of previous advertising content presented to the client device, the current video session comprising the playback of the video content and presentation of the advertising content;
predicting, by the one or more processors, for the first candidate content item format type based on the user disposition, a first likelihood that a user of the client device will abandon the current video viewing session prior to completion of the current video viewing session in response to presentation of the advertising content of the first candidate content item format type;
predicting, by the one or more processors, for the second candidate content item format type based on the user disposition, a second likelihood that the user of the client device will abandon the current video viewing session prior to completion of the current video viewing session in response to presentation of the advertising content of the second candidate content item format type;
determining, by the one or more processors, that the first likelihood is below a predetermined threshold;
determining, by the one or more processors, that the second likelihood is above the predetermined threshold; and
presenting, by the one or more processors in response to the determination that the first likelihood is below the predetermined threshold and the second likelihood is above the predetermined threshold, a content item to the client device in accordance with the first candidate advertising format type.

9. The method of claim 8, wherein determining that the first likelihood is below the predetermined threshold includes determining that the candidate content item format type is not likely to cause the user to abandon the current video viewing session.

10. A non-transitory computer storage medium encoded with a computer program, the computer program comprising instructions that when executed by one or more processors of a computer server cause the one or more processors to perform operations comprising:
receiving, at the one or more processors from a client device, a request for advertising content to present to the client device during playback of video content;
identifying, by the one or more processors, a first candidate content item format type and a second candidate content item format type, the first candidate content item format type and the second candidate content item format type selected from a group consisting of pre-video, post-video, in stream, overlay, and banner advertising format types;
identifying, by the one or more processors, a user disposition for a current video viewing session based on historical data of previous advertising content presented to the client device, the current video viewing session comprising the playback of the video content and presentation of the advertising content;
predicting, by the one or more processors, for the first candidate content item format type based on the user disposition, a first likelihood that a user of the client device will abandon the current video viewing session prior to completion of the current video viewing session in response to presentation of advertising content of the first candidate content item format type;
predicting, by the one or more processors, for the second candidate content item format type based on the user disposition, a second likelihood that the user of the client device will abandon the current video viewing session prior to completion of the current video viewing session in response to presentation of advertising content of the second candidate content item format type;

determining, by the one or more processors, that the first likelihood is less than the second likelihood;

selecting, by the one or more processors based on the determination, the first candidate advertising format type for presentation of a content item to the client device; and presenting, by the one or more processors, the content item to the client device in accordance with the first candidate advertising format type.

11. A system comprising:
a device, comprising a network interface in communication with a client device, and a processor executing a session manager, a user disposition identifier, a user behavior predictor, an advertising format type selector, and a content presentation system,
wherein the session manager is configured to:
receive, from the client device via the network interface, a request for advertising content to present to the client device during playback of video content, and
identify a first candidate content item format type and a second candidate content item format type, the first candidate content item format type and the second candidate content item format type selected from a group consisting of pre-video, post-video, in stream, overlay, and banner advertising format types;
wherein the user disposition identifier is configured to identify a user disposition for a current video viewing session based on historical data of previous advertising content presented to the client device, the current video viewing session comprising the playback of the video content and presentation of the advertising content;
wherein the user behavior predictor is configured to:
predict, for the first candidate content item format type based on the user disposition, a first likelihood that a user of the client device will abandon the current video viewing session prior to completion of the current video viewing session in response to presentation of advertising content of the first candidate content item format type;
predict, for the second candidate content item format type based on the user disposition, a second likelihood that the user of the client device will abandon the current video viewing session prior to completion of the current video viewing session in response to presentation of advertising content of the second candidate content item format type;
wherein the advertising format type selector is configured to select, based on a determination that the first likelihood is less than the second likelihood, the first candidate advertising format type for presentation of a content item to the client device; and
wherein the content presentation system is configured to present, via the network interface the content item to the client device in accordance with the first candidate advertising format type.

12. The system of claim 11, wherein the user behavior predictor is further configured to determine that the first candidate content item format type is not likely to cause the user to abandon the current video viewing session.

13. The system of claim 11, wherein the advertising format type selector is further configured to withhold a second content item of the second candidate format type based on a determination that the second likelihood is greater than a predetermined threshold.

14. The system of claim 11, wherein the advertising format type selector is further configured to select the content item of the first candidate advertising format type based additionally on the video content.

15. The system of claim 11, wherein the user disposition identifier is further configured to identify the user disposition based on current and historical session data including data related to previous video content presented to the client device, interaction by the user with the previous video content presented to the client device, previous advertising content presented to the client device, interaction by the user with the previous advertising content, and abandonment of previous video viewing sessions by the user.

16. The system of claim 11,
wherein the user disposition identifier is further configured to identify a second user disposition for the current video viewing session based on historical data of previous advertising content presented to the client device; and
wherein the user behavior predictor is further configured to:
predict, for the first candidate content item format type based on the second user disposition, a third likelihood that the user will abandon the current video viewing session prior to completion of the current video viewing session in response to presentation of advertising content of the first candidate content item format type, and
predict, for the second candidate content item format type based on the second user disposition, a fourth likelihood that the user will abandon the current video viewing session prior to completion of the current video viewing session in response to presentation of advertising content of the second candidate content item format type;
wherein the advertising format type selector is further configured to:
select, based on the third likelihood exceeding the fourth likelihood, the second candidate advertising format type for presentation of a second content item to the client device; and
wherein the content presentation system is further configured to present the second content item to the client device in accordance with the second candidate advertising format type.

17. The system of claim 11, wherein the user behavior predictor is further configured determine that the first likelihood is below a predetermined threshold.

18. The system of claim 17, wherein determining that the first likelihood is below the predetermined threshold includes determining that the first candidate content item format type is not likely to cause the user to abandon the current video viewing session.

19. A system comprising:
a device, comprising a network interface in communication with a client device, and a processor executing a session manager, a user disposition identifier, a user behavior predictor, an advertising format type selector, and a content presentation system,
wherein the session manager is configured to identify a first candidate content item format type and a second candidate content item format type for advertising content to be presented, via the network interface, to the client device during playback of video content, the first candidate content item format type and the second candidate content item format type selected from a group consisting of pre-video, post-video, in stream, overlay, and banner advertising format types;

wherein the user disposition identifier is configured to identify a user disposition for a current video viewing session based on historical data of previous advertising content presented to the client device, the current video session comprising the playback of the video content and presentation of the advertising content;

wherein the user behavior predictor is configured to:
  predict, for the first candidate content item format type based on the user disposition, a first likelihood that a user of the client device will abandon the current video viewing session prior to completion of the current video viewing session in response to presentation of the advertising content of the first candidate content item format type,
  predict, for a second candidate content item format type based on the user disposition, a second likelihood that the user of the client device will abandon the current video viewing session prior to completion of the current video viewing session in response to presentation of the advertising content of the second candidate content item format type,
  determine that the first likelihood is below a predetermined threshold;
  determine that the second likelihood is above the predetermined threshold; and
wherein the content presentation system is configured to present, in response to the determination that the first likelihood is below the predetermined threshold and the second likelihood is above the predetermined threshold, a content item to the client device, via the network interface, in accordance with the first candidate advertising format type.

20. The system of claim 19, wherein determining that the first likelihood is below the predetermined threshold includes determining that the first candidate content item format type is not likely to cause the user to abandon the current video viewing session.

* * * * *